United States Patent
Epstein

(10) Patent No.: US 8,422,995 B2
(45) Date of Patent: *Apr. 16, 2013

(54) WIRELESS MESSAGING SYSTEM

(76) Inventor: Natan Epstein, Beverly Hills, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/815,329

(22) Filed: Jun. 14, 2010

(65) Prior Publication Data

US 2010/0317333 A1    Dec. 16, 2010

Related U.S. Application Data

(63) Continuation of application No. 10/968,422, filed on Oct. 18, 2004, now Pat. No. 7,738,858.

(51) Int. Cl.
*H04L 12/58* (2006.01)

(52) U.S. Cl.
USPC .............. 455/412.1; 455/518; 455/414.1; 455/416; 455/519

(58) Field of Classification Search .............. 455/412.1, 455/436, 456.2, 560, 414.1, 442; 370/331; 342/357.4, 463; 340/7.27, 7.25, 7.41
See application file for complete search history.

(56) References Cited

U.S. PATENT DOCUMENTS

| | | | |
|---|---|---|---|
| 5,765,107 A * | 6/1998 | Korowajczuk | 455/410 |
| 6,442,396 B1 * | 8/2002 | Schmidt et al. | 455/518 |
| 7,149,553 B2 * | 12/2006 | Amin et al. | 455/572 |
| 7,209,950 B2 * | 4/2007 | Bennett et al. | 709/206 |
| 7,738,858 B2 * | 6/2010 | Epstein | 455/412.1 |
| 2001/0034233 A1 * | 10/2001 | Tiedemann et al. | 455/436 |
| 2003/0032462 A1 * | 2/2003 | Wang et al. | 455/574 |
| 2003/0119560 A1 * | 6/2003 | Takatori et al. | 455/564 |
| 2003/0148779 A1 * | 8/2003 | Aravamudan et al. | 455/519 |
| 2004/0044774 A1 * | 3/2004 | Mangalik et al. | 709/227 |
| 2004/0192290 A1 * | 9/2004 | Muthuswamy et al. | 455/425 |

* cited by examiner

*Primary Examiner* — Mahendra Patel

(57) ABSTRACT

Messages are routed via a cellular communications network to multiple cellular communications receivers configured for answering calls placed to a common subscriber number, such that a message originated with a single cellular call may reach multiple recipients. The geographic area of message distribution may be controlled by selectively enabling different cell sites for calling particular subscriber numbers. The cellular receivers may have message storage capabilities for subsequent replay of received messages. Message storage may be provided by downloading messages to a conventional telephone answering device also connected for landline telephone call answering, thereby adding received cellular messages to recorded landline telephone messages.

15 Claims, 2 Drawing Sheets

WIRELESS MESSAGING SYSTEM

This application is a Continuation of application Ser. No. 10/968,422 filed Oct. 18, 2004 which claims priority to the filing date of Provisional Application 60/496,945 filed Aug. 18, 2003

BACKGROUND OF THE INVENTION

1. Field of the Invention

This invention pertains to the field of cellular wireless communications, and more particularly relates to one way wireless messaging using cellular communications networks.

2. State of the Prior Art

Cellular wireless communication systems are widely deployed and used for mobile telephone and other communications. Current use typically involves communications between individual subscribers each equipped with a handheld cellular telephone unit. The mobile units are each assigned unique telephone numbers and cellular communications are typically private between parties known to the cellular network.

The mobile handsets communicate via a cellular network which includes transponder cellsites each having a limited area of coverage and located so as to provide contiguous areas or cells of radio coverage over a larger area of service. The mobile handsets periodically transmit an identification signal which is used to locate the handset within the coverage area of one or more cellsites. The cellsites in turn are networked by trunk lines and are managed by a central control office. The location of active handsets received by all of the cellsites is known to the digital control system, so that a call placed to a particular wireless handset is placed, either from another mobile handset or from a conventional landline telephone, can be directed to a cellsite within radio range of the target handset. Two way communication, by landline for example, can then be established from the central control office to the appropriate cellsite, and the link completed by two-way radio communication between the cellsite and the handset. A detailed description of the operation of cellular communication networks is not necessary here as the topic is relatively complex and the information is available from publicly accessible sources.

Communications using such cellular networks are directed to specific subscribers, that is, to particular telephone numbers in a cellular telephone network. While messaging services exist for directing communications such as text messages to multiple recipients, each of the message recipients is also specified to the cellular network and known to the sender.

SUMMARY OF THE INVENTION

This invention provides a wireless messaging system which in a presently preferred embodiment makes use of a cellular communications network such including a number of cellsites for routing wireless messages to subscribers located within range of one or more of the cellsites. The cellular communications network may be of the type which is normally configured for monitoring the presence and location of individual active mobile handsets relative to different cellsites, such that messages or calls addressed to any one mobile number can be routed through an appropriate cellsite within range of the handset corresponding to that mobile number. For purposes of this invention, however, the cellular network is configured to operate without monitoring or verifying the presence of mobile handsets corresponding to mobile numbers assigned to a special category of subscriber here referred to as a broadcast subscriber. The broadcast subscriber is assigned a broadcast number which may be a particular mobile telephone number. Calls placed to a broadcast number are transmitted by one or more broadcasting cellsites without verifying the presence of a mobile handset corresponding to that broadcast number in the area covered by those one or more cellsites. The broadcasting cellsites are selected by the broadcast subscriber, for example, as part of a subscription agreement with the cellular network service provider. The one-way message broadcasting aspect of the cellular network may coexist with conventional two-way mobile communications by the network.

A number of cellular communications receivers are installed at recipient sites located within range of the broadcast cellsites. Each receiver is configured to accept calls routed to a broadcast number. Multiple such receivers may be configured to accept calls addressed to a same broadcast number through the broadcast cellsite or cellsites, such that multiple receivers may receive a call placed to a single broadcast number. A particular broadcast call or message may be broadcast through more than one cellsite so as to cover a wider geographic area of reception. Also, a broadcast call may be stored by the cellular network provider for subsequent broadcast through one or more cellsites, for example, during off-peak times of network usage.

In typical cellular communications networks the cellsite initiates a two-way call or communication with a mobile handset by assigning available frequencies or channels for the communication session, including a receive frequency and a transmit frequency for the mobile handset. The cellular receivers used in the preferred embodiment of the present invention lack transmission capability, so that no assignment of transmit frequency is needed. However, the receivers are preferably responsive to communications channel assignment control signal transmitted by the broadcasting cellsite, such that the receiver switches to a receive frequency assigned for the particular broadcast by the broadcasting cellsite, so that the cellular broadcast can be made over a frequency then available to the broadcasting cellsite. This assignment of receive frequencies can be made in the conventional manner currently employed with conventional two way mobile telephone handsets, for example.

The cellular receivers preferably have message storage capabilities, such as digital storage, for subsequent replay of received messages.

In one embodiment of the invention the cellular receivers are stand alone units with built in message playback capability, including for example, audio playback of voice messages, and for this purpose may have an audio amplifier and loudspeaker as part of the receiver unit.

In another embodiment of the invention the cellular receivers cooperate with a conventional telephone answering device of the type commercially available for answering calls to landline telephones and storing voice messages for subsequent replay. In this embodiment the cellular receivers may be configured for receiving operating power from a landline telephone jack, and may be also configured for downloading stored cellular messages to the conventional telephone answering device for subsequent replay by the conventional answering device. In this latter embodiment, the cellular receivers may be built as a single unit together with the landline telephone answering device, for example, in a common housing.

In still other embodiments of the invention the cellular receivers may be preprogrammed for answering to one or more broadcast numbers. The cellular receivers may be reprogrammable by end users for answering to different or additional broadcast numbers.

These and other improvements, features and benefits will be better understood by reference to the following detailed description of the preferred embodiments.

DETAILED DESCRIPTION OF THE PREFERRED EMBODIMENTS

Figure 1:
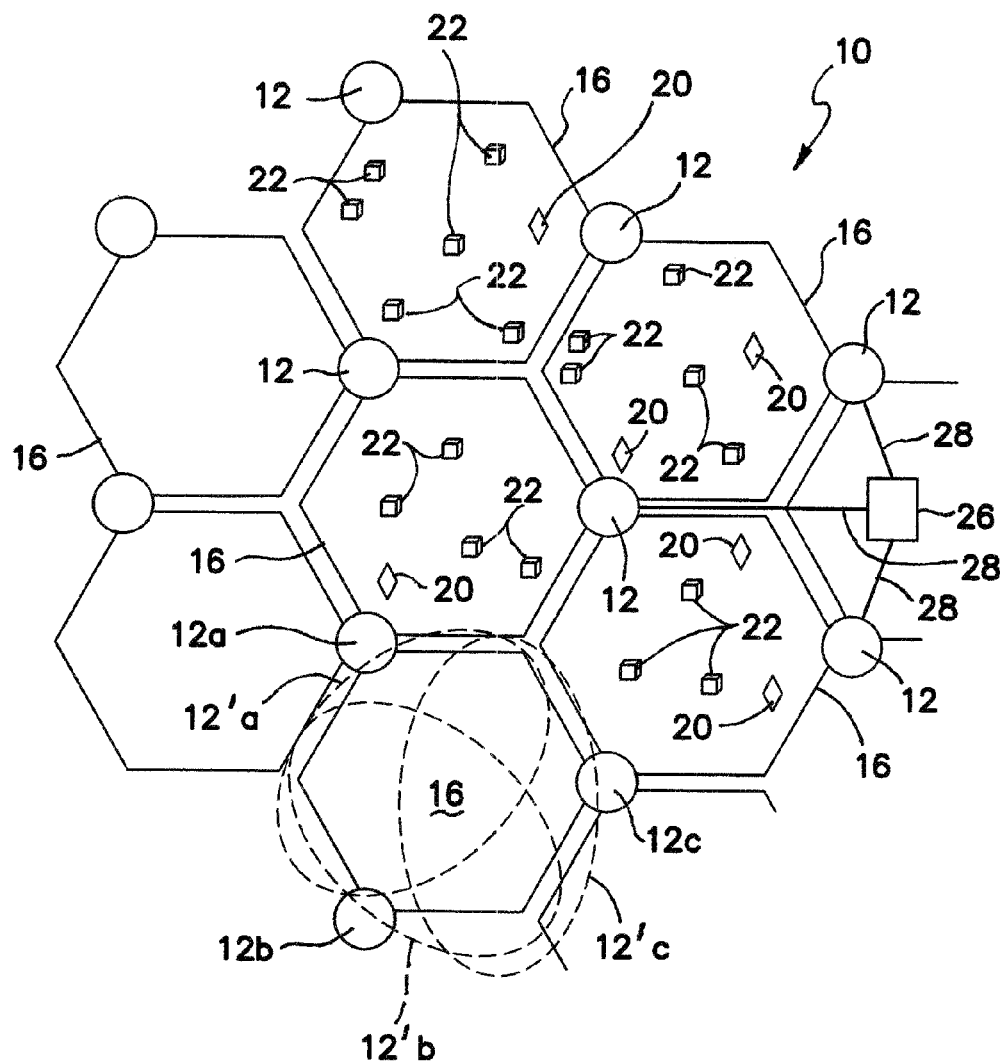
FIG. 1 depicts in schematic form a group of cellsites comprising part of a larger cellular communications network and a number of cellular receivers located in some of the cell areas of coverage provided by the cellsites.

FIG. 1 depicts in schematic form a group of cellsites 12 comprising part of a larger cellular communications network 10 and a number of cellular receivers 14 located in some of the cell areas 16 of coverage provided by the cellsites 12.

The cellular communications network 10 and cellsites 12 are configured with hardware and software operative for routing wireless calls and messages to mobile subscribers located within the area of coverage of the network and providing two-way communications with cellular handsets 20 carried by the mobile subscribers. The area of service provided by network 10 is divided into contiguous cells 16. Coverage for each cell 16 is provided by a group of corresponding cellsites 12. For example, cellsites 12a, 12b and 12c each include radio transmitters with antennas which have a generally elliptical radiation pattern suggested by ellipses 12'a, 12'b and 12'c respectively, such that these three cellsites together cover the area of one cell 16 contained generally between the cellsites. A conventional cellular communications network 10 is normally configured for monitoring the presence and location of conventional two-way mobile handsets 20 relative to different cellsites 12, such that messages or calls addressed to mobile numbers assigned to the two-way handsets can be routed by a mobile telecommunications switching office 26 through trunk lines 28 to an appropriate cellsite 12 within radio communications range of the mobile handset 20 corresponding to that mobile number.

For purposes of the messaging system of this invention, cellular communications receivers 22 are located within receiving range of the broadcast cellsites 12. Each receiver 22 is configured to accept calls routed to a broadcast number. However, in the presently preferred embodiment the cellular receivers 22 do not register with the cellular network by identifying themselves to any cellsites 12, and receivers 22 have no transmit capability at all so that many receivers can operate in one cell 16 without interference or conflict. For purposes of this invention, a subset of mobile numbers, which may be mobile telephone numbers reserved for broadcast use, is reserved for assignment to a special category of subscriber, which is here referred to as a broadcast subscriber. The cellular network 10 is configured through appropriate modification of either hardware, software or both, to make calls to any of the reserved broadcast numbers without testing for the presence of mobile receiving units pertaining to the broadcast numbers. The cellular receivers 22 are each configured to accept calls placed to one or more of the mobile numbers. Multiple broadcast subscribers are assigned different broadcast numbers. Each broadcast subscriber is able to send messages to a group of recipients, each recipient being equipped with a cellular receiver 22 programmed to answer calls placed to that broadcast subscriber's broadcast number. Different broadcast subscribers can reach different groups of broadcast recipients.

Calls placed to a broadcast number from a conventional telephone, either landline or cellular, are transmitted by one or more cellsites 12 without verifying the presence of a mobile handset 20 or receiver 22 corresponding to that broadcast number in the cells 16 covered by those cellsites 12. When operating in this broadcasting mode the cellsites 12 are referred to as broadcasting cellsites, although physically they may be the same cellsites 12. The cellsites 12 can operate in both conventional two-way private communication with individual subscribers, or broadcast mode for one-way transmission of messages from one caller to groups of recipients whose identity or presence is not necessarily known or detectable to the cellular network 10. Consequently, the one-way message broadcasting aspect of the cellular network may coexist with conventional two-way mobile communications on a given network 10.

Multiple such receivers 22 may be configured to accept calls addressed to a same broadcast number by any broadcast cellsite 12, such that multiple receivers 22 in the same cell 16 may receive a call placed to a single broadcast number. A particular broadcast call or message may be broadcast by multiple cellsites 12 to cover multiple cells 16, each containing multiple receivers 22 programmed to answer to the same broadcast number, for a wider geographic area of message reception. Also, broadcast calls may be stored by the cellular network system 10 for subsequent broadcast through one or more cellsites 12, for example, during off-peak times of network usage or to take advantage of momentary frequency availability.

The number of cells 16 covered by a cellular broadcast may be determined by the requirements of the broadcast subscriber, for example, as part of a subscription agreement with the cellular network service provider. The broadcasting cellsites 12 may be chosen, for example, to cover a geographic area populated by a given group having a common interest or belonging to a common organization such as a school or church. In such case the broadcast subscriber may be the school or church which is interested in efficiently communicating with its student body or congregants, respectively. In such organizations a large proportion of the group typically resides in general vicinity to the school or church. A cellular message may be delivered to all or most members of the group, when each is equipped with a cellular communications receiver 22, with a single telephone call placed to the broadcast number assigned to that broadcast subscriber by the cellular network service provider, from any telephone, whether landline or cellular, from anywhere in the world where phone service is available. The number of cellsites accessible by the broadcast subscriber may be a single cellsite for limited local coverage or may include many cellsites if wider area message delivery is needed.

In typical cellular communications networks 10 the cellsite 12 sets-up a two-way call or communication session with a mobile handset 20 by assigning available frequencies or channels for the communication session, including a receive frequency and a transmit frequency for the mobile handset 20. The cellular receivers 22 used in the preferred embodiment of the present invention lack transmission capability, so that no assignment of transmit frequency is needed. However, the receivers 22 may be responsive to communications channel assignment control signals transmitted by the broadcasting cellsites 12, such that the receiver 22 switches to a receive frequency assigned for the particular broadcast by the broadcasting cellsite 12, so that the cellular broadcast can be made over a frequency then available to the broadcasting cellsite 12. This assignment of receive frequencies by the cellsite 12 can be made in the conventional manner currently employed with conventional two way mobile telephone handsets 22, for example.

The cellular receivers preferably have message storage capabilities, such as digital storage, for subsequent replay of received messages.

In one embodiment of the invention the cellular receivers 22 are stand alone units with built in message playback capability, including for example, audio playback of voice messages, and for this purpose may have an audio amplifier and loudspeaker as part of the receiver unit.

Figure 2:
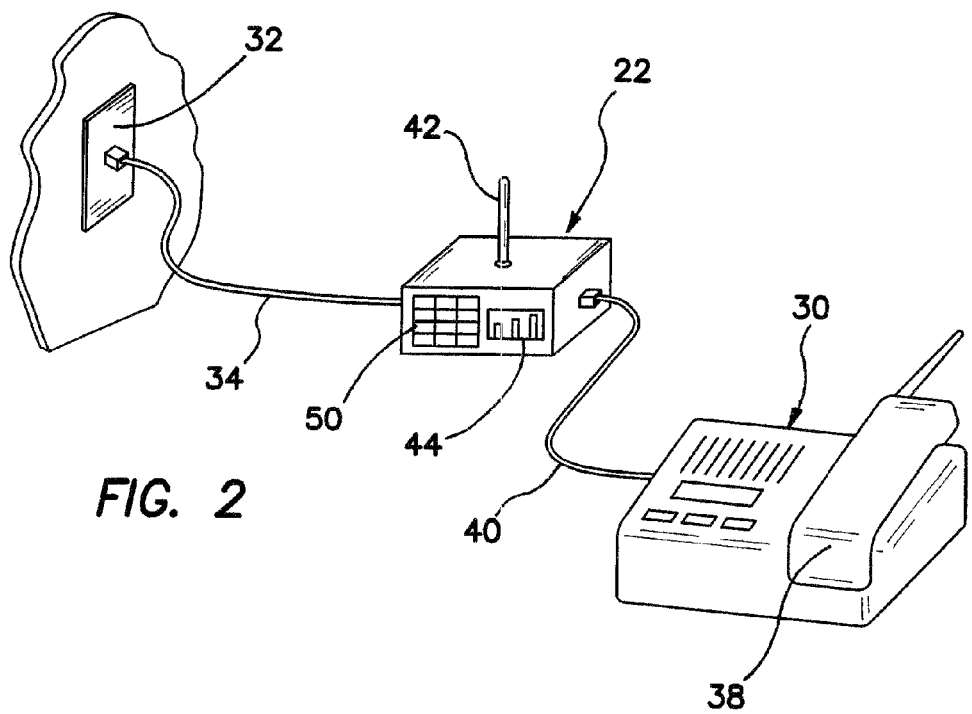
FIG. 2 is a perspective view of a cellular receiver unit according to this invention connected between a wall mounted telephone jack and a typical telephone answering device.

In another embodiment of the invention, illustrated in FIG. 2, the cellular receivers 22 is a unit equipped with a cellular antenna 42 and interconnected with a telephone answering device 30 of the type commercially available for answering calls made to landline telephones and storing voice messages for subsequent replay. In the illustrated example, answering device 30 includes a wireless handset 38. In this embodiment the cellular receivers 22 may be configured for receiving operating power from a landline telephone jack 32. Receiver 22 has a message storage capability, such as a digital storage, for storing receiver cellular broadcast messages. The receiver 22 is programmed to periodically download the cellular messages initially stored in receiver 22 via cord 40 for storage on answering device 30, for subsequent replay by the answering device 30. In such a system, messages received over the telephone land line 34 and the cellular messages received by the cellular receiver 22 may both be replayed in response to the message replay function of the answering device 30. In a variant of this latter embodiment, the cellular receivers 22 may be built as a single unit together with the landline telephone answering device 30, for example, in a common housing containing the necessary power supplies for both cellular receiver and answering device.

The cellular receiver 22 may be provided with an interface to the conventional answering device 30. The interface tests for availability of a dial tone from jack 32 to ensure that no landline telephone call is in progress that will be interrupted by offloading of the stored message. The interface may also take the landline telephone line "off-hook" while actuating the answering device 30 and offloading messages from cellular receiver 22. In FIG. 2, the receiver 22 includes appropriate switching for normally connecting answering device 30 to phone jack 32 and bypassing the receiver 22, and temporarily interrupting this connection for downloading stored cellular messages from receiver 22 to answering device 30. The answering device 30 need not differentiate between messages conventionally received via the telephone line 34 and messages received via the cellular receiver 22. Both types of messages are heard in the usual manner by activating the "play messages" function of the recipient's answering device 30. In this configuration this system operates with commercially available answering machines 30 of any brand or design without special setup or modification other than the connection of the cellular radio receiver 22 to the answering machine 30, normally between the recipient's incoming telephone line 34 and the answering machine 30, as shown.

The cellular receivers 22 may be preprogrammed for answering to one or more broadcast numbers, such that a given cellular receiver 22 may be used to receive messages from various broadcast subscribers representing different organizations of interest to the particular recipient. The cellular receivers 22 may be reprogrammable by end users for answering cellular calls placed to different or additional broadcast numbers, and for this purpose may have a numerical keypad or other suitable input device.

In yet another embodiment of the invention, the cellular receivers 22 are modified to include a transmitter section capable of reporting the presence of the receiver to a broadcasting cellsite 12 and registering with the network 10 in a manner similar to the reporting capability of existing two-way mobile telephones. In this embodiment the cellular receivers are registered with the cellular service provider in manner analogous to the registration of two-way mobile telephone handsets, although multiple cellular receivers are still configured to automatically receive calls or messages addressed to a given broadcast number. The broadcasting cellsites 12 in this embodiment can track the cellular receivers present in each cell 16, for example, for census or billing purposes.

In still other embodiments of the invention, a two-way cellular telephone unit such as a mobile handset 20 is modified so as to incorporate the functions of cellular receivers 22 of this invention without prejudice to its normal two-way functionality. For this purpose a separate cellular broadcast receiver 22 subsystem such as described above is included in the housing of the two-way cellular telephone unit 20 and configured to function independently of the two-way subsystem. Alternatively, the cellular receiver section of a two-way cellular telephone unit 22 is modified to also operate in a one-way messaging mode by automatically responding to cellular calls placed to a preprogrammed broadcast number.

The cellular telephone network is a convenient means for one-way transmission of messages. However, this invention is not limited to cellular networks and other radio frequency communication networks including simple radio frequency transmitters operating at any convenient frequency can be also employed for message transmission to the multiple receivers 22.

Implementation of the various embodiments disclosed above can be accomplished by those having an ordinary level of skill in cellular communications network engineering or related technologies, based upon the foregoing description without an undue degree of experimentation.

Particular embodiments of the invention have been described for purposes of clarity and example. It will be understood, however, that many changes, modifications and substitutions to the described embodiments will be apparent to those having only ordinary skill in the art without thereby departing from the scope of the invention as defined in the following claims.

What is claimed as new is:

1. A cellular wireless messaging system adapted for addressing multiple cellular receivers by originating a single cellular call to a preassigned group broadcast number, comprising:

a cellular radio communications network including a plurality of cellsites for routing cellular calls addressed to one or more subscriber cellular telephone numbers within a geographic area of coverage of said cellsites, wherein presence and location of individual active cellular telephone handsets is monitored relative to different ones of said cellsites such that a call directed to a particular cellular telephone number can be routed through an appropriate one of said cellsites within range of a handset corresponding to said particular cellular telephone number;

a subset of said subscriber cellular telephone numbers reserved for assignment to broadcast subscribers of said network; and a plurality of cellular radio communications receivers distributed within said geographic area of coverage, each configured to automatically accept cellular calls addressed by said cellsites to a same one of said cellular telephone numbers within said subset such that multiple of said cellular radio receivers may each receive a particular cellular call addressed to a single cellular telephone number within said subset, each of said cellular radio communications receivers being associated with a two-way cellular telephone set thereby enabling a cellular telephone call to be sent to multiple said cellular receivers by originating a single cellular call while also tracking the presence of said cellular radio communications receivers present for census or billing purposes by way of said two way cellular telephone set such that each cellular receiver is capable of registering its presence with one or more of said cellsites.

2. The cellular wireless messaging system of claim 1 wherein said particular cellular call may be a voice call or a text message.

3. The cellular wireless messaging system of claim 1 wherein each of said cellular radio communications receivers is included in a housing of a two-way mobile cellular telephone handset.

4. The cellular wireless messaging system of claim 3 wherein said cellular radio communications receiver included in said housing is configured to function independently of said two-way mobile cellular telephone handset.

5. The cellular wireless messaging system of claim 1 wherein each of said cellular radio communications receivers is a section of a two-way mobile cellular telephone handset configured to also operate in a one-way message receiving mode by automatically responding to cellular calls placed to a one of said cellular telephone numbers in said subset preprogrammed in said receivers.

6. The system of claim 1 wherein each of said cellular radio communications receivers is user programmable for answering cellular calls placed to one or more different ones of said cellular telephone numbers in said subset.

7. A cellular wireless messaging system adapted for addressing multiple cellular receivers by originating a single cellular call to a pre-assigned group broadcast number, comprising:

a cellular radio communications network including a plurality of cellsites for routing cellular calls addressed to one or more subscriber cellular telephone numbers within a geographic area of coverage of said cellsites, wherein presence and location of individual active cellular telephone handsets is monitored relative to different ones of said cellsites such that a call directed to a particular cellular telephone number can be routed through an appropriate one of said cellsites within range of a handset corresponding to said particular cellular telephone number;

a subset of said subscriber cellular telephone numbers reserved for assignment to broadcast subscribers of said network; and a plurality of cellular radio communications receivers distributed within said geographic area of coverage, each configured to automatically receive cellular calls addressed by said cellsites to a same one of said cellular telephone numbers within said subset such that multiple of said cellular radio receivers may each receive a particular cellular call addressed to a single cellular telephone number within said subset, thereby enabling a cellular telephone call to be sent to multiple cellular receivers by originating a single cellular call, each of said cellular radio communications receivers having digital voice message storage capabilities for subsequent replay of received messages, and wherein each of said cellular radio communications receivers is user programmable for automatically answering and storing cellular calls placed to one or more user selected ones of said cellular telephone numbers in said subset.

8. The cellular wireless messaging system of claim 7 wherein each of said cellular radio communications receivers is capable of registering its presence with one or more of said cellsites.

9. The cellular wireless messaging system of claim 7 wherein said cellular radio communications receivers comprise a two-way cellular mobile telephone handset modified to incorporate the functions of a said cellular radio communications receiver without prejudice to its normal two-way functionality.

10. The cellular wireless messaging system of claim 7 wherein each of said cellular radio communications receivers is included in a housing of a two-way mobile cellular telephone handset.

11. The cellular wireless messaging system of claim 10 wherein said cellular radio communications receiver included in said housing is configured to function independently of said two-way mobile cellular telephone handset.

12. The cellular wireless messaging system of claim 7 wherein each of said cellular radio communications receivers is a section of a two-way mobile cellular telephone handset configured to also operate in a one-way message receiving mode by automatically responding to cellular calls placed to a broadcast number in said subset preprogrammed in said receivers.

13. A cellular wireless messaging system adapted for addressing multiple cellular receivers by originating a single cellular call to a pre-assigned group broadcast number, comprising:

a cellular radio communications network including a plurality of cellsites for routing cellular calls addressed to one or more subscriber cellular telephone numbers within a geographic area of coverage of said cellsites, wherein presence and location of individual active cellular telephone handsets is monitored relative to different ones of said cellsites such that a call directed to a particular cellular telephone number can be routed through an appropriate one of said cellsites within range of a handset corresponding to said particular cellular telephone number;

a subset of said subscriber cellular telephone numbers reserved for assignment to broadcast subscribers of said network; and a plurality of cellular radio communications receivers distributed within said geographic area of coverage and responsive to communications channel assignment control signals transmitted by said cellsites, each configured to automatically accept cellular calls addressed by said cellsites to a same one of said cellular telephone numbers within said subset such that multiple of said cellular radio receivers may each receive a particular cellular call addressed to a single cellular telephone number within said subset, thereby enabling a cellular telephone call to be sent to multiple cellular receivers by originating a single cellular call;

each of said cellular radio communications receivers being user programmable for answering cellular calls placed to one or more user selected ones of said cellular telephone numbers within said subset.

14. The system of claim 13 wherein said cellular communications network is configured for forwarding a call originated to a single cellular telephone number through more than one of said cellsites such that multiple ones of said receivers in range of different ones of said cellsites may be addressed by a call to said single cellular telephone number.

15. The system of claim 13 wherein said receivers are configured for downloading stored voice messages to a conventional telephone answering device of the type adapted for answering calls made to landline telephones and storing voice messages for subsequent replay.

* * * * *